(12) United States Patent
Robkin et al.

(10) Patent No.: US 7,461,784 B2
(45) Date of Patent: Dec. 9, 2008

(54) SYSTEMS AND METHODS FOR THE SELF-CHECKOUT OF SECURED ITEMS FROM A LENDING ESTABLISHMENT

(75) Inventors: Shai Steven Robkin, Atlanta, GA (US); Robert Craig Chandler, Lawrenceville, GA (US)

(73) Assignee: Vernon Library Supplies, Inc., Norcross, GA (US)

( * ) Notice: Subject to any disclaimer, the term of this patent is extended or adjusted under 35 U.S.C. 154(b) by 0 days.

(21) Appl. No.: 11/422,134

(22) Filed: Jun. 5, 2006

(65) Prior Publication Data

US 2007/0278297 A1 Dec. 6, 2007

(51) Int. Cl.
*G06K 15/00* (2006.01)
(52) U.S. Cl. .......................... 235/383; 705/18
(58) Field of Classification Search ................. 235/383, 235/382, 380, 381, 382.5, 462.01, 462.13, 235/385; 705/18
See application file for complete search history.

(56) References Cited

U.S. PATENT DOCUMENTS

| | | | |
|---|---|---|---|
| 4,881,061 A * | 11/1989 | Chambers ................ 340/572.1 |
| 5,095,195 A * | 3/1992 | Harman et al. ............... 235/381 |
| 5,288,980 A * | 2/1994 | Patel et al. .................. 235/381 |
| 6,142,375 A * | 11/2000 | Belka et al. .................. 235/454 |
| 2002/0123932 A1* | 9/2002 | Brenhouse .................... 705/16 |
| 2003/0125974 A1* | 7/2003 | Frich .............................. 705/1 |
| 2006/0016885 A1* | 1/2006 | Roberts et al. .............. 235/383 |
| 2006/0116899 A1* | 6/2006 | Lax et al. ........................ 705/1 |
| 2006/0138220 A1* | 6/2006 | Persky ......................... 235/383 |

* cited by examiner

*Primary Examiner*—Daniel A Hess
(74) *Attorney, Agent, or Firm*—Sutherland Asbill & Brennan LLP (57) ABSTRACT

The present invention provides systems and methods for the self-checkout of secured items from a lending or sales establishment. A self-checkout system may be configured to determine a patron's eligibility to checkout items. Subsequently, the system may be configured to determine whether an item wished to be checked out by a patron is stored in a secure locked case. The present invention provides means for allowing the patron to unlock the secure locked case without the need of library staff assistance. A blocking mechanism is provided which controls access to the unlocking mechanism such that a patron may only unlock a secure locked case when authorized to do so by the system.

35 Claims, 4 Drawing Sheets

SYSTEMS AND METHODS FOR THE SELF-CHECKOUT OF SECURED ITEMS FROM A LENDING ESTABLISHMENT

TECHNICAL FIELD

The present invention relates generally to the self-checkout of secured items from a lending establishment. More particularly, the present invention relates to systems and methods for providing the ability for a secure form of self checkout of items that are contained in secure locked cases through the use of an unlocking mechanism that may be operated by approved patrons of a lending or sales establishment. Access to the unlocking mechanism is made available to approved patrons only after the aforementioned secured items are properly checked out from the establishment.

BACKGROUND OF THE INVENTION

Self-checkout at item lending establishments, such as libraries, has become increasingly popular over the last few years. They may provide much faster and more convenient check out methods for patrons, and allow the establishment staff to have additional time performing job duties other than handling check out functions that can be accomplished by the patrons. One concern that has developed from the use of such self-checkout systems is the incompatibility of the systems when patrons desire to checkout goods that are subject to a greater amount of security.

For example, many libraries allow patrons to check out digital video discs (DVDs). These DVDs, which due to their small size and high value are prime targets for theft, are often protected by a secure locked case to prevent access to the disc itself and, if an electronic article surveillance (EAS) system is in use, to a security strip that may be on the disc or inside the case, Thus, in prior art checkout systems, the patron would be required to take the DVD to a checkout desk where a library employee would be required to unlock, and if necessary, remove the security case so that the disc is accessible the patron. This requires library staff members to take time away from other job responsibilities to assist patrons each and every time a patron desires to checkout a DVD.

The increased popularity of DVDs, CDs, and other digital media means that the selection of such items made available for checkout is steadily increasing and will continue to do so over the next many years. Thus, more and more library staff time will have to be devoted towards handling the secure checkout of these items. Existing prior art self-checkout systems do not alleviate this problem as they provide no means for the patron who is eligible to check out such goods to do so without library staff assistance. Therefore, there exists a need for a self-checkout system that retains the integrity of implemented security features and allows the patron to check out electronic media and other secured items on their own without staff assistance.

SUMMARY OF THE INVENTION

The present invention meets the above-described needs by providing a system and method for allowing the self-checkout of secured items from a lending establishment. In one embodiment of the present invention a patron may scan her identification card across a scanner when she is ready for checkout. The scanner may communicate with a database to determine the patron's eligibility to checkout items.

In an embodiment of the present invention, the patron may scan the item she wishes to check out across a scanner. In some embodiments of the present invention, the scanner may communicate with a database to determine whether the item is stored in a secure locked case. In an alternative embodiment of the present invention, the deactivation of the EAS security bit that is contained within a radio frequency identification (RFID) tag attached to the item serves as evidence that the item has been properly checked out, thus eliminating the need to communicate with a database.

After the system of the present invention determines that an item wished to be checked out is stored in a secure locked case, the system releases a blocking mechanism which restricts access to a security case unlocking mechanism. When the blocking mechanism is released, the system may provide instructions to the patron as to how to insert the secured item into the secure case unlocking mechanism. In the preferred embodiment of the present invention, the unlocking mechanism contains a key-like structure which operates to fit with the secure locked case to facilitate its unlocking or detachment.

In one embodiment of the present invention, access to the secure case unlocking mechanism is controlled through the use of a security bit stored on the RFID tag attached to the item. The RFID reader detects whether a single deactivated security bit is within its reading field. When a single deactivated security bit is within its reading field, the blocking mechanism goes to a released state. When no deactivated security bits are detected, the blocking mechanism remains in a closed state. These and other features, aspects and embodiments of the invention will be described in more detail below.

BRIEF DESCRIPTION OF THE DRAWINGS

FIG. 3, comprising

DETAILED DESCRIPTION OF THE INVENTION

The present invention now will be described more fully hereinafter with reference to the accompanying drawings, in which some, but not all embodiments of the invention are shown. Indeed, these inventions may be embodied in many different forms and not be construed as limited to the embodiments set forth herein; rather, these embodiments are provided so that this disclosure will satisfy applicable legal requirements. Like numbers refer to like elements throughout.

The present invention is described below with reference to block diagrams and flowchart illustrations of systems, methods, apparatuses and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

There are a myriad of situations in which a library or other item lending or sales provider may wish to add a further layer of security to certain items due to their higher monetary value, ease of theft, or simply to protect the totality of the provider's inventory. To accomplish this additional layer of security an item provider may use a secure locked case which encloses the protected item. This secure locked case may be made of a hard plastic or other suitable material that is not easily removed without a proper unlocking device. Such a secure locked case discourages theft. If the item stolen is contained in the secure locked case, assess to the item will be greatly prohibited as the forceful removal of the secure locked case can lead to the destruction of the item itself. The secure locked case may also prevent access to an EAS security tag or strip that will set off the exit gates' alarms unless deactivated as a result of a proper checkout. One example of a secure locked case is the KWIK CASE™.

It should be recognized that in other embodiments of the present invention, the secure locked case may be locked in a number of different fashions. For example, the secure locked case may be secured through a clip, pin, or other securing mechanism. Also, in other embodiments of the present invention, the secure outer case may be used in place of the original item packaging. When this is the case, typically the unlocking mechanism simply will unlock the secure outer case, and the unlocked case remains with the checked out item.

In one embodiment of the present invention, it is contemplated that a patron has an identification card. One example of such an identification card would be a library card issued by a library at which the patron wishes to borrow items from. Such an identification card may have a bar code on it which contains a unique identification number corresponding to the patron. Alternatively, the identification card may contain an integrated RFID tag, or be a magnetic stripe card or a smart card. For example, an RFID tag may contain information pertinent to the patron, including a means of uniquely identifying the patron. Such identification cards are typically presented at the time of self checkout.

Figure 1:
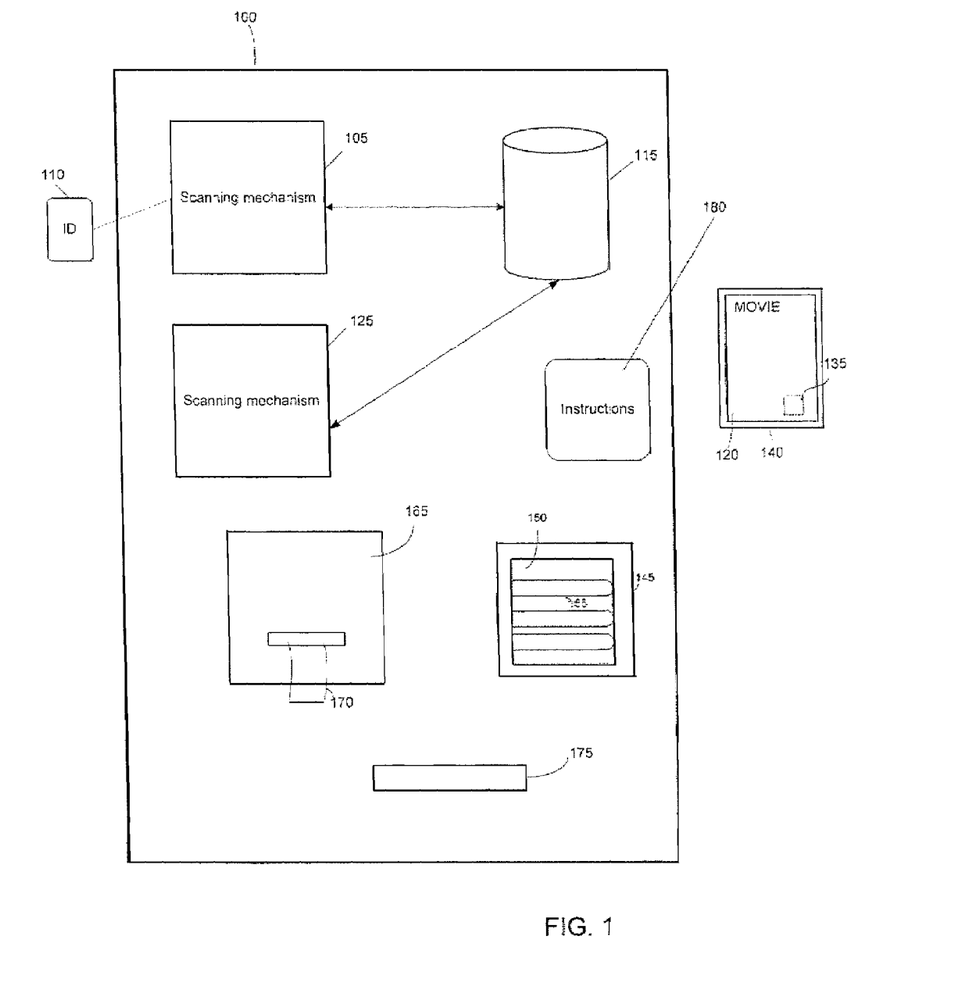
FIG. 1 is a block diagram illustrating an exemplary system in accordance with certain embodiments of the present invention.

Exemplary embodiments of the present invention will hereinafter be described with reference to the figures, in which like numerals indicate like elements throughout the several drawings. FIG. 1 depicts a self checkout system 100, as contemplated in one embodiment of the present invention. The self checkout system 100 contains a scanning mechanism 105 for reading the information from a patron's identification card 110. In the case of a patron's identification card 110 containing bar code information, the scanning mechanism 105 may be a bar code reader. Such bar code readers may be hand-held or integrated as part of a larger machine. Bar code readers are well known in the art. Alternatively, if the patron's identification card 110 contains an RFID tag, the system may integrate an RFID tag reader instead. Such RFID tag readers are also well known in the art.

In an embodiment of the present invention, the scanning mechanism 105 may be connected to a database 115 which stores patron information. A typical database 115 may contain files for each unique patron each containing fields for name, contact information; outstanding checked out items, fees due, etc. The scanning mechanism 105 transmits the read patron identification information to a processor (not depicted) within the system 100. This processor can compare the transmitted information with the corresponding information stored in the database 115. Thus, the system 100 can make a determination as to whether the patron is eligible to checkout a secured item 120.

In one example, a library patron may scan her identification card 110 over a bar code reader 105. The bar code reader 105 receives the patron's unique identification number from the card 110 and subsequently transmits that identification number to the processor. The processor may then query the database 115 and retrieve the information stored corresponding to that patron. If that patron has outstanding unpaid library fines that exceed an established limit, the processor will not approve that patron to checkout additional secured (or unsecured) items.

In an embodiment of the present invention, the system 100 contains a second scanning mechanism 125 for receiving information about an item that the patron wishes to checkout. It should be recognized that it is possible for the system 100 to be configured such that this second scanning mechanism 125 may be the same scanning mechanism 105 that is used to receive information from the patron's identification card. Furthermore, it should be recognized that this second scanning mechanism 125 may be either a bar code of RFID type scanner. Individual lending organizations may have varying ways in which items available for checkout are monitored and inventoried. For example, in an establishment where secured goods 120 are identified through the use of printed bar codes adhered to the items, a bar code scanner would be appropriate. Similarly, where items are identified through information containing RFID tags, an RFID scanner would be the appropriate choice. The system 100 depicted here is shown with a bar code scanner 125.

In the case of a system implementing a bar code scanning mechanism 125, the patron may scan the item tag 135 and the identification information retrieved by the bar code scanning mechanism 125 is transmitted to a processor within the system 100. In an embodiment of the present invention, the scanning mechanism 125 may be connected to a database 115 which stores item information. A typical item database 115 may contain files for each uniquely identified item, each containing data fields for relevant inventory data. In one embodiment of the present invention, the files for each uniquely identified item may contain a field which indicates whether or not the item is stored in a secure locked case 140.

Thus, the system 100 can make a determination as to whether a particular item requires that a secure locked case 140 be unlocked and, where necessary, deposited in a retaining container 175 before the patron may leave with the secured item 120. It should be noted that in various embodiments of the present invention the database containing patron information and the database storing item information could be separate databases.

In one embodiment of the present invention, the system 100 contains an unlocking mechanism 145 which may be used for unlocking and, if necessary, removing the secure locked case 140 from the secure item 120. The unlocking mechanism 145 may be designed specifically for the type of secure locked case 140 used by the lending establishment. For example, the unlocking mechanism 145 may contain a key-like structure within in it that inserts into an opening in the secure locked case 140 to trigger its opening. As discussed above, in alternate embodiments of the present invention, the unlocking mechanism 145 may contain means for removing clips, pins, and other devices used to lock the secure outer case 140.

Typically, access to the unlocking mechanism 145 is regulated by a blocking mechanism 150. This is to prevent an unscrupulous patron from having unlimited access to the unlocking mechanism 145, thereby increasing the chances for theft of secured items 120 not properly checked out. In one embodiment of the present invention, the blocking mechanism 150 consists of retractable members 155 that can extend across the opening to the unlocking mechanism 145. Preferably the retractable members 155 are metallic in nature and thus stronger and less likely to be broken intentionally or accidentally by a patron. Thus, when the blocking mechanism 150 is engaged, a patron may not insert a secured item 120 into the unlocking mechanism 145 as access will be blocked by the extended members 155.

In one embodiment of the present invention, after a determination has been made by the system 100 that a patron is authenticated to checkout items, and the last scanned item is a secured item 120 protected by a secure locked case 140, the processor may trigger the retracting of the members 155 in the blocking mechanism 150 which opens access to the unlocking mechanism 145. At this point, the system 100 may instruct the patron on the proper way to insert the secure locked case into the unlocking mechanism and to remove, if needed, locking clips, pins or entire outer locking cases. Upon the removal of the secured item 120, the retractable members 155 return to an unretracted blocking state.

The system 100 may at this point await the scanning of additional secured items 120 and repeat the processes described above. In an alternative embodiment of the present invention, the system will contain a printer 165 capable of printing a receipt 170 upon completion of self checkout by the patron. Typically, such printed receipts 170 will contain identification of each item checked out by the patron.

In another alternate embodiment of the present invention, the system further comprises an integrated retaining container 175 for the patron to deposit the detached secure locked case 140, after removal from the secured item 120. This allows the lending establishment to maintain secure locked cases 140, or locking clips or pins so removed such that they may be easily stored and re-used. In some embodiments, the retaining container 175 can be a separate container not physically connected to the self-checkout system 100. For example, the retaining container 175 may be located at the exit of the lending establishment.

In an embodiment of the present invention, the self checkout system 100 may contain an integrated display (not shown) for displaying instructions to guide the patron through the self checkout process for secured items 120. A typical display would be a monitor capable of video and audio output. For example, the display may provide instructions to the patron indicating how to insert the secured item 120 into the unlocking mechanism 145 and detaching the secured locked case 140 from the secured item 120. Additionally, the display may provide instructions to the patron indicating how to deposit the secure locked case 140 into the retaining container 175 after removal from the secured item 120. It should be understood that in various embodiments of the present invention, audio instructions may be provided in conjunction with or as an alternative to video instructions.

Figure 2:
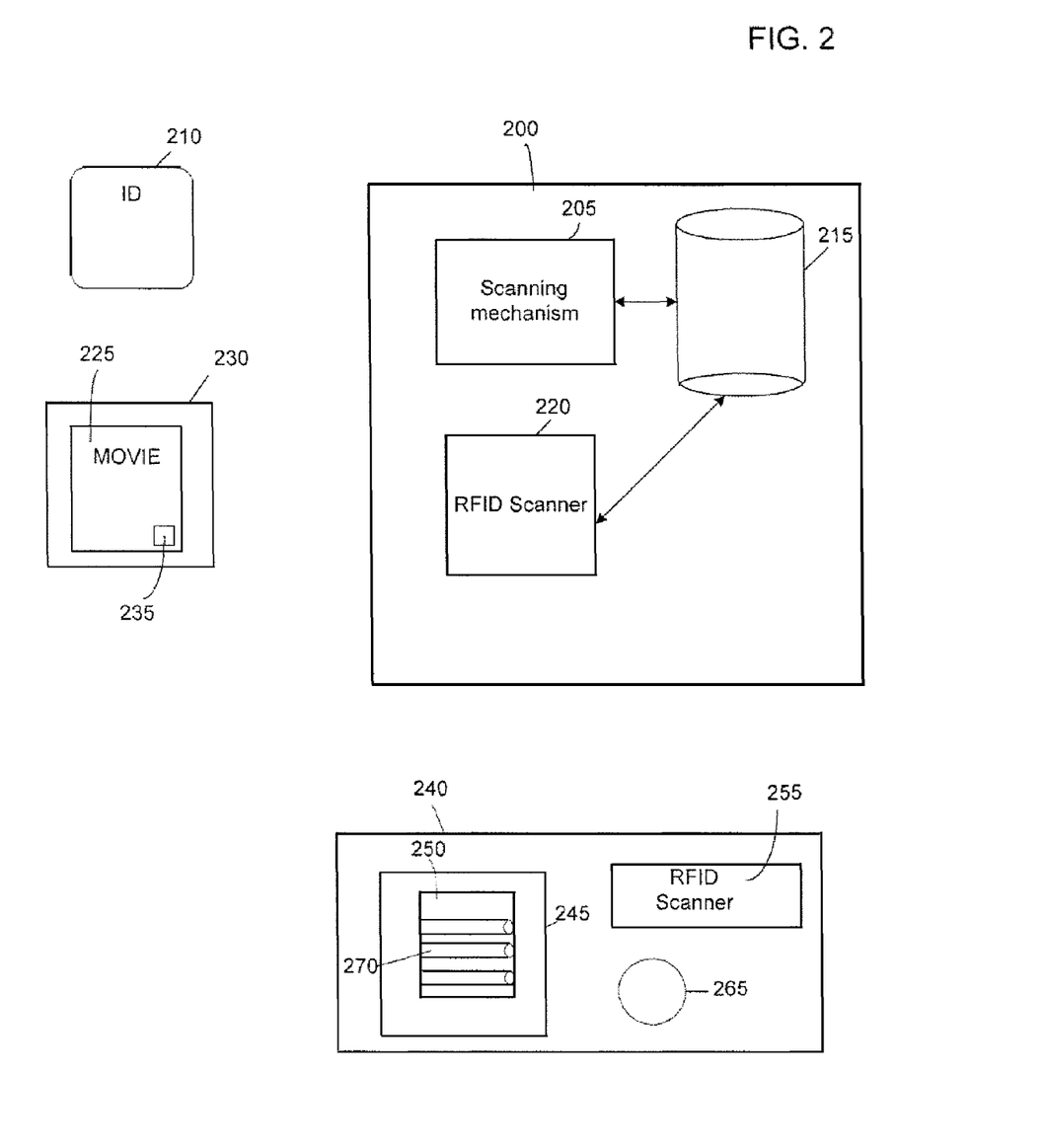
FIG. 2 is a block diagram illustrating a separate exemplary system in accordance with certain embodiments of the present invention.

FIG. 2 depicts a system operable according to one embodiment of the present invention. The self-checkout system 200 contains a scanning mechanism 205 for reading a patron's identification card 210. The scanning mechanism 205 is connected to a database 215 containing information corresponding to each patron with an account at the lending establishment, including status information as to whether the patron is eligible to checkout a secured item 225.

The self-checkout system 200 may also contain an RFID scanning mechanism 220 for scanning each item that the patron wishes to checkout. It should be recognized that in certain embodiments of the present invention, the RFID scanning mechanism 220 and the scanning mechanism 205 may be one and the same.

Each secured item 225 is protected by a secure locked case 230. An RFID tag 235 is attached to the secured item 225. If a secured item 225 is stored in a secure locked case 230, the RFID tag's 235 contained security bit will be active at the time that the patron initially selects the secured item 225 for check out. When a patron scans the secured item 225 across the RFID scanning mechanism 220, if the patron has been determined as eligible to checkout secured items and the item is approved for checkout, the security bit in the RFID tag 235 is deactivated.

The system includes a secure case unlocking unit 240. It should be understood that while the presently discussed embodiment depicts the secure case unlocking unit 240 as a separate unit, it may easily be incorporated into the self-checkout system 200 as a single unit. The secure case unlocking unit 240 contains an unlocking mechanism 245 which contains the necessary components for unlocking of the secure locked case 230, allowing if necessary the removal of the secured item 225 from the secure locked case 230 or alternatively, the removal of a locking clip or pin from the case 230. It should be understood that the components contained in the unlocking mechanism 245 may differ depending on the securing components contained on the secure locked case 230.

Access to the unlocking mechanism 245 is controlled by a blocking mechanism 250. In the depicted embodiment, the blocking mechanism 250 consists of metal members 270 secured across the opening to the unlocking mechanism 245. Again, it should be understood that the blocking mechanism 250 may consist of any suitable retractable structure to control access to the unlocking mechanism 245, such that the unlocking mechanism 245 may only be accessed when the blocking mechanism 250 is released and retracted as the user places the secured item in the unlocking mechanism following a successful checkout. Upon the removal of the secured item 225, the retractable members 270 return to an unretracted blocking state.

The secure case unlocking unit 240 also contains an RFID scanner 255. The RFID scanner 255 functions to determine whether the security bit in the secure item's 225 RFID tag's 235 security bit is deactivated. If so, the blocking mechanism 250 will be released. This will allow the patron to insert the secure item 225 into the unlocking mechanism 245 and, if necessary, to remove the secure locked case 230.

In certain embodiments of the present invention the unlocking unit 240 may have a security light 265 attached thereto. If a patron presents a secured item 225 where the security bit on the RFID tag 235 is not deactivated, the blocking mechanism 250 will remain in position and the security light 265 may be illuminated to alert staff that a patron may need assistance with self-checkout. In addition, an audible alert may be sounded.

Those skilled in the art will appreciate that the operating environment shown in and described with respect to FIGS. 1 and 2 are provided by way of example only. Numerous other operating environments, system architectures and device configurations are possible. Accordingly, the present invention should not be construed as being limited to any particular operating environment, system architecture or device configuration.

Figure 3A:
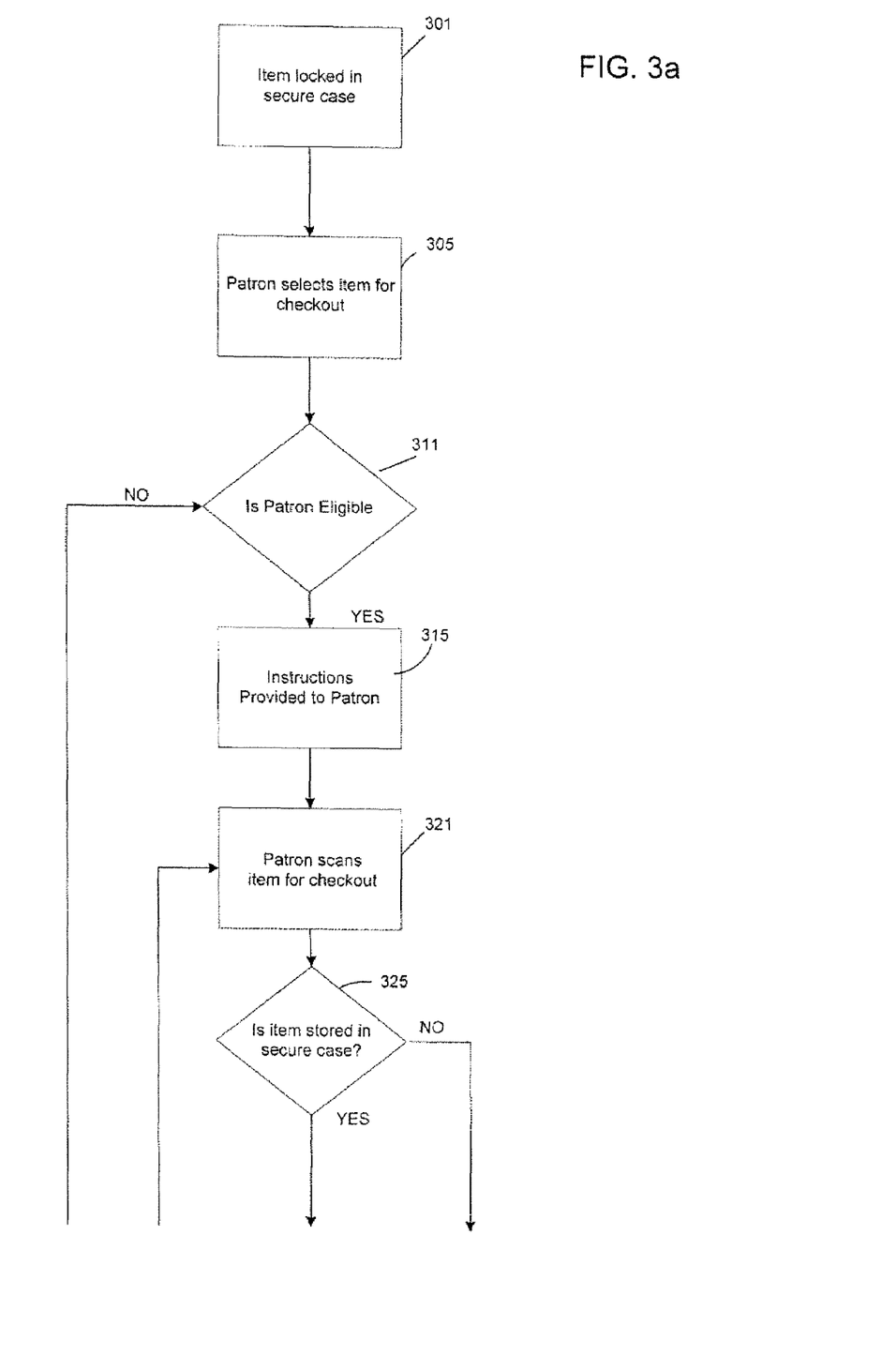
FIG. 3a and FIG. 3b, is a flow chart illustrating an exemplary method for usage of a self checkout system in accordance with certain embodiments of the present invention.
Figure 3B:
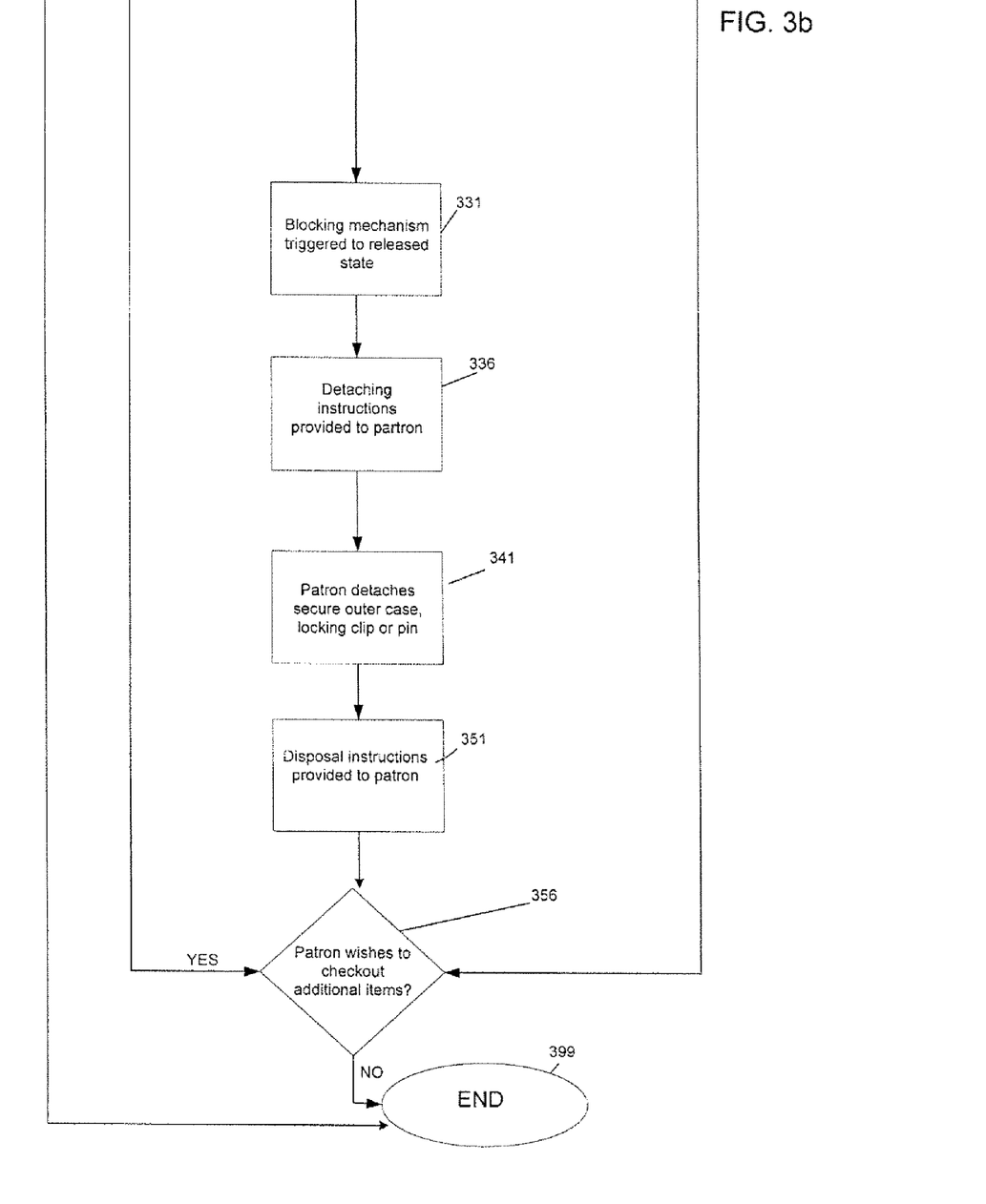

FIG. 3 depicts the operation of the system, according to one embodiment of the present invention. The method commences at step 301 where the lending establishment locks an item in a secure locked case. Ideally, this secure locked case is separate from the original packaging of the item as to avoid damage to the original item and to provide a separate layer of security over the original packaging. The method then proceeds to step 305, where a patron of the lending establishment selects a secure item and brings it to the system to commence self checkout.

To commence self checkout, the method proceeds to step 311, where the patron scans her identification card at the scanning mechanism. The scanning mechanism receives the identification information and compares it to stored criteria to determine eligibility to checkout a secure item. If the patron meets the eligibility criteria, the method proceeds to step 315. If the patron does not meet the eligibility criteria, the method proceeds to step 399 where the method terminates as the patron has not been authenticated to checkout secured items.

At step 315, the authenticated patron may be provided with instructions to scan an item across a second scanning mechanism. The method then proceeds to step 321 where the patron scans the secured item across the second scanning mechanism. In this particular embodiment of the present invention, it is assumed that the second scanning mechanism is an RFID scanner. The scanner retrieves the information stored on the RFID tag attached to the secured item. The method next proceeds to step 325 where the processor determines whether the scanned item is contained in a secure locked case. This information is stored on the RFID tag of the scanned item. If the item is not contained in a secure locked case the method proceeds to step 356.

If at step 325 it is determined that the item is contained within a secure locked case, the method proceeds to step 331, where the processor triggers the blocking mechanism to retract its locking members and allow access to the unlocking mechanism. The method next proceeds to optional step 336, where instructions are provided to the patron concerning how to properly insert the secure item into the unlocking mechanism and, if necessary, how to remove the secure locked case from the item or remove the locking clip or pin.

After removal of the secure locked case in step 336, the method proceeds to step 341 where the patron operates to detach the secure locked case from the item or remove the locking clip or pin in the unlocking mechanism. This may alert the processor to trigger the blocking mechanism to re-extend its locking members to an unretracted state to again prevent access to the unlocking mechanism.

The method may proceed to optional step 351, where instructions are provided to the patron concerning how to properly insert the detached secure outer case or locking clip or pin in a provided collection receptacle. After step 351, the method proceeds to step 356, where it is determined if the patron chooses to scan additional items for checkout. If it is determined at step 356 that the patron wishes to checkout additional items, the method return to step 315. If it is determined that the patron does not wish to checkout additional items, the method proceeds to step 399 and self checkout of the items is completed.

As may be seen from the foregoing, the present invention provides systems and methods for providing secure self checkout of secured items made available by lending establishments. It should be appreciated that the exemplary aspects and features of the present invention as described above are not intended to be interpreted as required or essential elements of the invention, unless explicitly stated as such. It should also be appreciated that the foregoing description of exemplary embodiments was provided by way of illustration only and that many other modifications, features, embodiments and operating environments are possible. Accordingly, the scope of the present invention should be limited only by the claims to follow.

We claim:

1. A system for self-checkout of secured items from a lender comprising:
　a first scanning mechanism for reading a patron's identification card, where the first scanning mechanism is connected to a first database which contains the previously stored patron's status for checkout of secured items;
　a first processor for authenticating a patron's identification card by comparing the information stored on the identification card when the previously stored patron's status to determine eligibility to checkout a secured item;
　a second scanning mechanism for receiving information about a scanned item;
　a second database containing previously stored information identifying certain items as secured items;
　a second processor for determining whether the scanned item is contained in a secure locked case based at least in part on information previously stored in the second database and associated with the scanned item;
　an unlocking mechanism for unlocking a secure locked case from a secured item, wherein access is denied to the unlocking mechanism unless the secured item is determined to be contained in a secure locked case by the second processor and the patron has been authenticated; and
　a blocking mechanism to prevent use of the unlocking mechanism, wherein the blocking mechanism comprises at least one retractable member to prevent access to the unlocking mechanism to prevent secured item from being inserted into unlocking mechanism, and wherein the blocking mechanism is released to allow insertion of the secure item into the unlocking mechanism only after a secured item has been approved for checkout.

2. The system of claim 1 wherein the secured item is one of a videocassette, digital video disc, compact disc, or software.

3. The system of claim 1 wherein the patron's identification card is a card issued by a library at which the patron is checking out secured items.

4. The system of claim 1, wherein the second scanning mechanism is a barcode reader.

5. The system of claim 1, wherein the second scanning mechanism is an RF tag reader.

6. The system of claim 1, wherein the blocking mechanism consists of retractable metal members that prevent access to the unlocking mechanism until retracted.

7. The system of claim 1, further comprising a retaining container for the patron to deposit the secure locked outer case or locking pin or clip after the unlocking of said secure locked case.

8. The system of claim 1, wherein the secure locked case is locked through the use of one of the group consisting of: one or more clips, one or more pins, or one or more integrated locks.

9. The system of claim 1, wherein the secure locked case replaces the original outer packaging of the secured item.

10. The system of claim 1, further comprising a display for displaying instructions to the patron indicating how to insert the secured item into the unlocking mechanism and unlocking the secure locked case from the item and how to deposit the secure locked outer case or locking pin or clip into the retaining container after removal from the secured item.

11. The system of claim 1, further comprising speakers for providing instructions to the patron indicating how to insert the secured item into the unlocking mechanism and unlocking the secure locked case from the item and how to deposit the secure locked case into the retaining container after removal from the secured item.

12. The system of claim 1, further comprising a printer for printing a receipt indicating the items checked out by the patron.

13. The system of claim 1, where the patron's identification card is one of the group consisting of: a magnetic stripe card, a smart card, or a card with an integrated RFID tag.

14. The system of claim 1, where the second scanning mechanism element and the first scanning mechanism element are the same.

15. The system of claim 1, where the second database contains previously stored information identifying certain items as secured items and contains files for each uniquely identified item, each file containing data fields including a field that indicates whether or not the item is stored in a secure locked ease.

16. A method for self-checkout of secured items from a lender comprising the steps of:
locking an item in a secure locked case;
authenticating a patron's identification card by scanning the identification card on a scanning mechanism and confirming that the patron is allowed to checkout secured items by comparing the information stored on the identification card with the previously stored patron's status;
if patron is authenticated, displaying instructions instructing the patron to scan an item over a second scanning mechanism;
scanning the item over the second scanning mechanism;
determining whether the scanned item is contained in a secure locked case based at least in part on previously stored information identifing certain items as secured items;
blocking access to an unlocking mechanism with a blocking mechanism comprising at Least one retractable member positioned to prevent the use of the unlocking mechanism if the item is determined to be contained in a secure locked case until after secured item has been approved for checkout and the patron has been authenticated;
actuating the blocking mechanism to allow access to the unlocking mechanism;
inserting the secured item into the unlocking mechanism;
unlocking the secure locked case with the unlocking mechanism so that the secure locked ease may be removed from the item;
securing a blocking mechanism upon removal of the secure locked case from the unlocking mechanism.

17. The method of claim 16, wherein the secured item is one of a videocassette, digital video disc, compact disc, or software.

18. The method of claim 16, wherein the patron's identification card is a card issued by a library at which the patron is checking out secured items.

19. The method of claim 16, wherein the second scanning mechanism is a barcode reader.

20. The method of claim 16, wherein the second scanning mechanism is a RFID tag reader.

21. The method of claim 16, wherein the secure locked case is locked through the use of one of the group consisting of: one or more clips, one or more pins, or one or more integrated locks.

22. The method of claim 16, wherein the secure locked outer case replaces the original outer packaging of the secured item.

23. The method of claim 16, where the patron's identification card is one of the group consisting of: a magnetic stripe card, a smart card, or a card with an integrated REID tag.

24. The method of claim 16, further comprising the step of depositing the secure outer case, locking pin or clip into an attached retaining container after the unlocking of said secure outer case, locking clip or pin from the secured item.

25. The method of claim 16, further comprising the step of displaying instructions to the patron indicating how to insert the secured item into the unlocking mechanism and unlocking the secure locked case from the item and how to deposit the secure locked case, locking clip or pin into the retaining container after removal from the secured item.

26. The method of claim 16, wherein determining comprises comparing the scanned item information to stored database information, wherein database contains files for each uniquely identified item, each file containing data fields for relevant inventory data and a field which indicates whether or not the item is stored in a secure locked case.

27. The method of claim 16, wherein determining comprises reading the information stored on the scanned item's RFID tag attached to the secure locked case, wherein the RFID tag's security bit is initially active at the time that the patron selects the secured item for check out, but if the patron has been determined as eligible to checkout secured item, and if the secured item is approved for checkout, the security bit in the RFID tag is deactivated when a patron scans the secured item across the RFID scanning mechanism and the blocking mechanism will be released to allow the patron to insert the secure item into the unlocking mechanism for removal of the secure locked case.

28. A system for self-checkout of secured items from a lender comprising:
a first scanning mechanism for reading a patron's identification card, where the first scanning mechanism is connected to a database which contains the previously stored patron's status for checkout of secured items;
a first processor for authenticating a patron's identification card by comparing the information stored on the identification card with the previously stored patron's status to determine eligibility to checkout a secured item;

a second scanning mechanism for receiving information about a scanned item, wherein the information includes at least one security bit and item identification;

an RF identification tag attached to the secured item containing at least information identifying the item and a security bit identifying the item as a secured item;

a second processor for determining whether the scanned item is contained in a secure locked case based at least in part on information previously stored in the second database and associated with the scanned item;

a second processor for determining whether the scanned item is contained in a secure locked case by comparing information received from the second scanning mechanism to information stored on the RF identification tag;

an unlocking mechanism for unlocking a secure locked case from a secured item, wherein access is denied to the unlocking mechanism unless the secured item is determined to be contained in a secure locked case by the second processor and the patron has been authenticated; and a blocking mechanism to prevent use of the unlocking mechanism, wherein the blocking mechanism comprises at least one retractable member to prevent access to the unlocking mechanism to prevent secured item from being inserted into unlocking mechanism, and wherein the blocking mechanism is released to allow insertion of the secure item into the unlocking mechanism only after a secured item has been approved for checkout.

29. The system of claim 28, further comprising a security light which is activated if a patron attempts to unlock a secure locked case where the security bit has not been deactivated.

30. The system of claim 28, wherein the secure locked case is locked through the use of one of the group consisting of: one or more clips, one or more pins, or one or more integrated locks.

31. The system of claim 28, wherein the first and second scanning mechanisms are remotely located from one another.

32. The system of claim 28, further comprising a retaining container for the patron to deposit the secure locked case after the unlocking of said secure locked case from the secured item.

33. The system of claim 28, wherein the secure locked outer case replaces the original outer packaging of the secured item.

34. The system of claim 28, where the patron's identification card is one of the group consisting of: a magnetic stripe card, a smart card, or a card with an integrated RFID tag.

35. The method of claim 28, further comprising the second processor determining whether the scanned item is contained in a secure locked case by comparing information received from the second scanning mechanism to information stored on the RF identification tag, wherein the RFID tag's security bit is initially active at the time that the patron selects the secured item for check out, but if the patron has been determined as eligible to checkout secured item, and if the secured item is approved for checkout, the security bit in the RFID tag is deactivated when a patron scans the secured item across the RFID scanning mechanism and the blocking mechanism will be released to allow the patron to insert the secure item into the unlocking mechanism for removal of the secure locked case.

* * * * *